United States Patent
Suryakant Devangan et al.

(10) Patent No.: US 12,189,459 B2
(45) Date of Patent: Jan. 7, 2025

(54) SUSPENSION AND DISABLING OF FAULTING DEVICES POWERED THROUGH POWER OVER ETHERNET

(71) Applicant: Palo Alto Networks, Inc., Santa Clara, CA (US)

(72) Inventors: Suryakant Devangan, San Jose, CA (US); Jeslin Antony Puthenparambil, Santa Clara, CA (US); Sneha Srinivasan, Fremont, CA (US); Arun Athrey Chandrasekaran, Milpitas, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 124 days.

(21) Appl. No.: 18/048,584

(22) Filed: Oct. 21, 2022

(65) Prior Publication Data
US 2024/0134729 A1 Apr. 25, 2024
US 2024/0231979 A9 Jul. 11, 2024

(51) Int. Cl.
*G06F 11/00* (2006.01)
*G06F 1/3287* (2019.01)
*G06F 11/07* (2006.01)

(52) U.S. Cl.
CPC ........ *G06F 11/0709* (2013.01); *G06F 1/3287* (2013.01); *G06F 11/076* (2013.01); *G06F 11/0763* (2013.01)

(58) Field of Classification Search
CPC ............... G06F 11/0709; G06F 11/076; G06F 11/0763; G06F 1/3287
See application file for complete search history.

(56) References Cited

U.S. PATENT DOCUMENTS

| | | | |
|---|---|---|---|
| 10,379,921 B1 | 8/2019 | Venkatagiri et al. | |
| 2005/0246562 A1* | 11/2005 | Rimboim | G06F 1/266 713/300 |
| 2008/0204220 A1* | 8/2008 | Baird | G08B 25/04 340/533 |

OTHER PUBLICATIONS

Hewlett Packard Enterprise Development, "Power over Ethernet events", 2021, [online], [retrieved on Jul. 13, 2022] Retrieved from the internet: <https://www.arubanetworks.com/techdocs/AOS-CX/10.07/HTML/5200-8214/Content/events/POE.htm>, 2021.

* cited by examiner

*Primary Examiner* — Michael Maskulinski
(74) *Attorney, Agent, or Firm* — Gilliam IP PLLC

(57) ABSTRACT

Power sourcing equipment ("PSE") can temporarily suspend or indefinitely disable powered devices ("PDs") exhibiting faults for more efficient resource utilization and preservation of the PSE hardware. The PSE maintains a first counter for each connected PD that indicates a count of fault events detected for the PD. Upon detecting a count of fault events for a PD within a designated time period that exceeds a first threshold, the PSE suspends the PD and increments a second counter maintained for the PD that indicates how many times the PD has been suspended. The PSE suspends processing of/responding to communications received from the suspended PD for the duration of the suspension. Subsequent fault detection and suspension for the PD can continue until the suspension count of the PD exceeds a second threshold, which triggers disabling of the faulty PD by discontinuing processing of/responding to communications received from the PD indefinitely.

20 Claims, 7 Drawing Sheets

SUSPENSION AND DISABLING OF FAULTING DEVICES POWERED THROUGH POWER OVER ETHERNET

BACKGROUND

The disclosure generally relates to data processing (e.g., CPC class G06F) and to responding to the occurrence of a fault (e.g., CPC subclass G06F 11/07).

Power over Ethernet ("PoE") technologies provide for both sourcing of power and transmission of data over Ethernet cabling. With PoE, power sourcing equipment ("PSE") sources power over an Ethernet cable to a PoE-enabled device to power the device. The Ethernet cable via which the PSE powers the device also provides a data connection between the PSE and the device. Examples of PoE-enabled devices include wireless access points ("APs") and Voice over Internet Protocol ("VoIP") technologies. Implementations of PoE can vary, though several Institute of Electrical and Electronics Engineers ("IEEE") standards for PoE have been developed. These IEEE standards include 802.3af (the original IEEE PoE standard), 802.3at, and 802.3bt.

Link Layer Discovery Protocol ("LLDP") runs on Ethernet-connected devices, including those of PoE systems, for transmission of information about the connected devices. LLDP is a link layer protocol in the Internet protocol suite. The protocol data unit ("PDU") of LLDP comprises a header and one or more Type-Length-Value ("TLV") attributes. TLVs comprise type, length, and value fields. The type and length fields that precede the value field of a TLV indicate the type of information included in the value field and the length of the value field. LLDP supports mandatory, optional, and custom TLVs.

BRIEF DESCRIPTION OF THE DRAWINGS

Embodiments of the disclosure may be better understood by referencing the accompanying drawings.

DESCRIPTION

Figure 1:
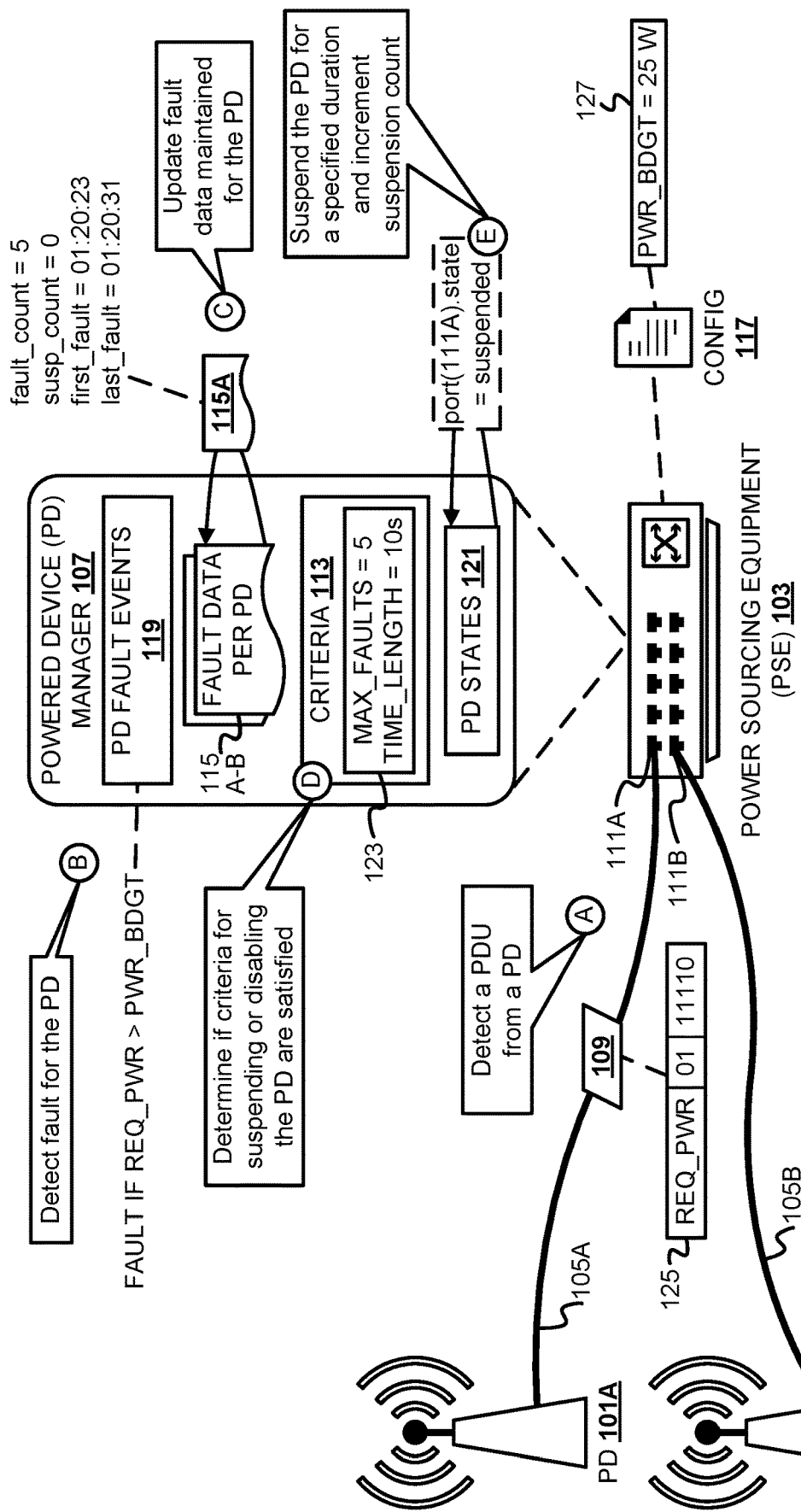
FIG. 1 is a conceptual diagram of temporarily suspending a powered device based on detecting faults of the powered device.

The description that follows includes example systems, methods, techniques, and program flows to aid in understanding the disclosure and not to limit claim scope. Well-known instruction instances, protocols, structures, and techniques have not been shown in detail for conciseness.

Terminology

This description uses various terminology related to PoE standards. When referring to "power sourcing equipment," this description is referring to a device that sources power to a PoE-enabled device via Ethernet cabling to power the PoE-enabled device. When referring to a "powered device" ("PD"), this description is referring to a device powered via Ethernet cabling. Powering of PDs by PSE according to PoE can be according to one of a plurality of standard or non-standard (e.g., proprietary) implementations.

This description uses the term "PDU" to refer to a single unit of information transmitted between a source and a destination in network communications. A PDU is formatted in accordance with its associated communication protocol, and PDU formats vary across communication protocols at different layers in the protocol stack. For instance, a PDU can encompass a frame, a packet, and/or a segment/datagram for link layer/data link layer communication protocols, Internet layer/network layer communication protocols, and transport layer communication protocols, respectively.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

Faulty powered devices can create numerous issues in a PoE system, including port/link flapping, port blockage, and inefficient utilization of a power budget of the PSE. Some faults such as overcurrent can even harm the PSE hardware. Faulty powered devices deployed in a software-defined wide area network ("SD-WAN") can further cause excessive transmission of alerts by the PSE to the SD-WAN controller. Techniques for powered device management are described herein by which PSE can temporarily suspend or indefinitely disable (i.e., blacklist) powered devices experiencing faults for more efficient resource utilization and preservation of the PSE hardware. The PSE tracks counts of fault events detected for each connected powered device. Upon detecting a count of fault events for a powered device within a designated time period that exceeds a first threshold (e.g., five or more fault events in ten seconds), the PSE suspends the powered device and increments a second counter it maintains for the powered device that indicates a count of suspensions of the powered device. The PSE temporarily discontinues processing of and responding to communications (e.g., interrupts) received from the suspended powered device for the duration of the suspension period. Subsequent fault detection and suspension for the powered device can continue until the suspension count of the powered device exceeds a second threshold. Exceeding the second threshold triggers disabling of the powered device in which the PSE discontinues processing of and responding to communications received from the powered device indefinitely, which eliminates the necessity for a physical disconnection of the Ethernet cable by which the powered device is connected to the PSE to disable the faulty powered device. When a powered device has been disabled, the PSE can redistribute its power budget across other powered devices connected thereto and thus does not waste resources on the powered device once it has been removed from service.

Example Illustrations

FIG. 1 is a conceptual diagram of temporarily suspending a powered device based on detecting faults of the powered device. A PD 101A and a PD 101B are connected to PSE 103 that comprises a plurality of Ethernet ports. In this example, the PSE 103 is depicted as an Ethernet switch and the PDs 101A-B are depicted as wireless APs, though other PoE-enabled devices can be utilized in embodiments. An Ethernet cable 105A connects the PD 101A to the PSE 103 on a port 111A of the PSE 103. An Ethernet cable 105B connects the PD 101B to the PSE 103 on a port 111B of the PSE 103. The PSE 103 powers the PDs 101A-B via respective ones of the Ethernet cables 105A-B, and data are also passed between the PDs 101A-B and the PSE 103 over the Ethernet cables 105A-B. Passing of power and data between the PSE 103 and PDs 101A-B via respective ones of the Ethernet cables 105A-B is according to PoE. PoE can be implemented for powering of the PDs 101A-B by the PSE 103 according to one of the various IEEE standards defined for PoE or according to a non-standardized (e.g., proprietary) PoE implementation. In this example, as indicated by a configuration 117 of the PSE 103 (e.g., a configuration file(s) installed thereon), the PSE 103 has a power budget 127 of 25 Watts (W) that can be sourced to powered devices connected thereto. A PD manager 107 executes on the PSE 103. The PD manager 107 manages fault detection for and suspension and disabling of powered devices that are powered by the PSE 103.

FIG. 1 is annotated with a series of letters A-E. These letters represent stages of one or more operations. Although these stages are ordered for this example, the stages illustrate one example to aid in understanding this disclosure and should not be used to limit the claims. Subject matter falling within the scope of the claims can vary from what is illustrated.

At stage A, the PD manager 107 detects a PDU 109 transmitted by the PD 101A that is received on the port 111A. The PD manager 107 monitors the ports 111A-B for communications from the PDs 101A-B, such as incoming PDUs, events, and/or interrupts. The PD manager 107 can periodically (e.g., each second) poll the ports 111A-B for incoming communications from the PDs 101A-B. The PDU 109 is an LLDP data unit that comprises a TLV 125. This example depicts the type field of the TLV 125 as "REQ_PWR" and the length field as having a value of 1 for clarity, though TLVs in implementations will comport to the TLV structure defined for LLDP and with defined TLV type values. The TLV 125 indicates a request for 30 W of power, represented with the binary number 11110 in FIG. 1, by the PD 101A.

At stage B, the PD manager 107 detects a fault for the PD 101A. The PD manager 107 has been preconfigured to detect a plurality of events as faults for the corresponding PD, which are indicated in PD fault events 119. Powered devices may be preconfigured to generate events that are transmitted to PSE when faults occur, and implementation of event generation may be according to a protocol implemented by and/or configuration of powered devices. The PD fault events 119 can be implemented with rules for detecting faults based on events generated by powered devices or PDUs received from powered devices, such as based on event identifiers, types and/or subtypes of PDUs, and/or a value(s) of one or more fields of event data and/or PDUs. A first of the PD fault events 119 indicates that a power request by a PD having a wattage that exceeds the power budget 127 is treated as a fault for the requesting PD. The PD manager 107 examines the TLVs of the PDU 109 to determine if the PDU 109 comprises a power request for a wattage that exceeds the power budget 127. Because the TLV 125 of the PDU 109 indicated a requested power value of 30 W and the power budget 127 of the PSE 103 is 25 W, the PD manager 107 detects a fault for the PD 101A.

At stage C, the PD manager 107 updates fault data maintained for the PD 101A. The PD manager 107 maintains fault data per PD 115A-B (hereinafter "fault data 115A-B") that correspond to the PDs 101A-B. The PD manager 107 can initialize and maintain data structures for each port of the PSE 103 (e.g., each Ethernet port) and update the data structures as faults corresponding to the ports (i.e., faults of powered devices connected to the ports) are detected. Each data structure stores data about faults detected for and any suspensions of the powered device connected to the corresponding port. An exemplary format of each of the fault data 115A-B is provided below. The exemplary fault data comprise fields indicating a count of faults detected for the corresponding powered device, a count of suspensions of the powered device, timestamps of the first and last (i.e., most recent) faults detected for the powered device, and a timestamp of a beginning of a suspension period of the powered device. These are exemplary fields are provided to aid in understanding, and the fault data 115A-B can have other formats and/or different/other fields than those described for this example.

```
typedef struct {
    uint8_t fault_count;              // number of faults detected for the PD
    uint8_t suspension_count;         // number of suspensions of the PD
    uint64_t first_fault_timestamp;   // timestamp of first fault
    uint64_t last_fault_timestamp;    // timestamp of most recent fault
    uint64_t suspension_timestamp;    // timestamp of PD suspension
}
```

The PD manager 107 updates the fault data 115A-B for corresponding ones of the PDs 101A-B with values of each of the pertinent fields as the PDs 101A-B fault and the faults are detected by the PD manager 107. Since the fault was detected for the PD 101A and the fault data 115A correspond to the PD 101A, the PD manager 107 updates the fault data 115A. The PD manager 107 at least updates the fault data 115A to increment a fault count maintained for the PD 101A and may also record the timestamp of the fault. The timestamp can be a timestamp recorded by the PD manager 107 at the time of receipt of the PDU 109 or a timestamp associated with the PDU 109. If the fault was the first fault detected for the PD 101A (i.e., the incremented fault count has a value of one), the PD manager 107 can record the timestamp of the fault in fields of the fault data 115A indicating both the first fault and the last fault. In this example, which assumes that four faults were previously detected, the incremented fault count has a value of five, so the PD manager 107 records the timestamp in the field indicating the time of the last fault, which is depicted as "01:20:31" in this example. This example also assumes that the first fault was detected previously with a timestamp of "01:20:23."

At stage D, the PD manager 107 determines if criteria for suspending or disabling the PD 101A are satisfied. The PD manager 107 is configured with criteria 113 that comprise one or more criteria for suspending PDs that fault and one or more criteria for disabling faulty powered devices after repeated suspensions. The criteria 113 can be implemented with rules, thresholds, etc. FIG. 1 depicts an exemplary first of the criteria 113 for powered device suspension, suspension criteria 123, which comprise a fault count threshold having a value of five and a time length having a value of 10 seconds. Thus, as the fault data 115A-B are updated, the PD manager 107 evaluates the updated fault data based on the suspension criteria 123 to determine if the fault data 115A-B satisfy the suspension criteria 123 through indication that the fault count satisfies the threshold of five faults that have been detected within a period of 10 seconds. For the fault data 115A, the PD manager 107 evaluates the fault count based on the threshold indicated in the suspension criteria 123 and determines that the fault count satisfies the threshold. To determine whether the fault count threshold was exceeded within the length of time given by the suspension criteria 123, the PD manager 107 can determine a difference between the timestamps of the first and last faults recorded in the fault data 115A. The difference between the timestamps of the first and last faults recorded in the fault data 115A is 12 seconds. Thus, five faults were detected for the PD 101A within the length of time designated by the suspension criteria 123, and the suspension criteria 123 are thus satisfied for the PD 101A.

At stage E, the PD manager 107 suspends the PD 101A for a specified duration and increments the suspension count for the PD 101A. The PD 101A increments the suspension count maintained for the PD 101A in the fault data 115A to reflect that the PD 101A has been suspended. When incrementing the suspension count in the fault data 115A, the PD manager 107 can also reset the fault count maintained in the fault data 115A to zero or a null value. The duration of the suspension period can be given by the suspension criteria 123. The PD manager 107 suspends the PD 101A so that communications received on the port 111A will not be processed or responded to throughout the duration of the suspension. Suspending the PD 101A can include updating the configuration 117 of the PSE 103 with a rule indicating that communications received on the port 111A should not be processed or responded to while within the suspension period. As a result, the PSE 103 does not process PDUs received on the port 111A while the PD 101A is suspended, nor does the PSE 103 transmit data to the PD 101. The PD manager 107 also tracks states of powered devices connected to the PSE 103 with PD state data 121. The PD state data 121 may comprise port identifiers and/or numbers for physical and/or logical ports of the PSE 103 to identify those to which powered devices may be connected. For each port identifier and/or number for ports on which a PD is connected, the PD state data 121 indicates a state of the powered device connected to the port, which may be represented as active, suspended, or disabled. The PD manager 107 updates the state maintained for the port 111A in the PD state data 121 to reflect that the PD 101A has been suspended. Eventually, the suspension period will end, after which the PD manager 107 updates the configuration 117 and the state of the port 111A in the PD state data 121 accordingly and resumes processing of PDUs received on the port 111A.

Figure 2:
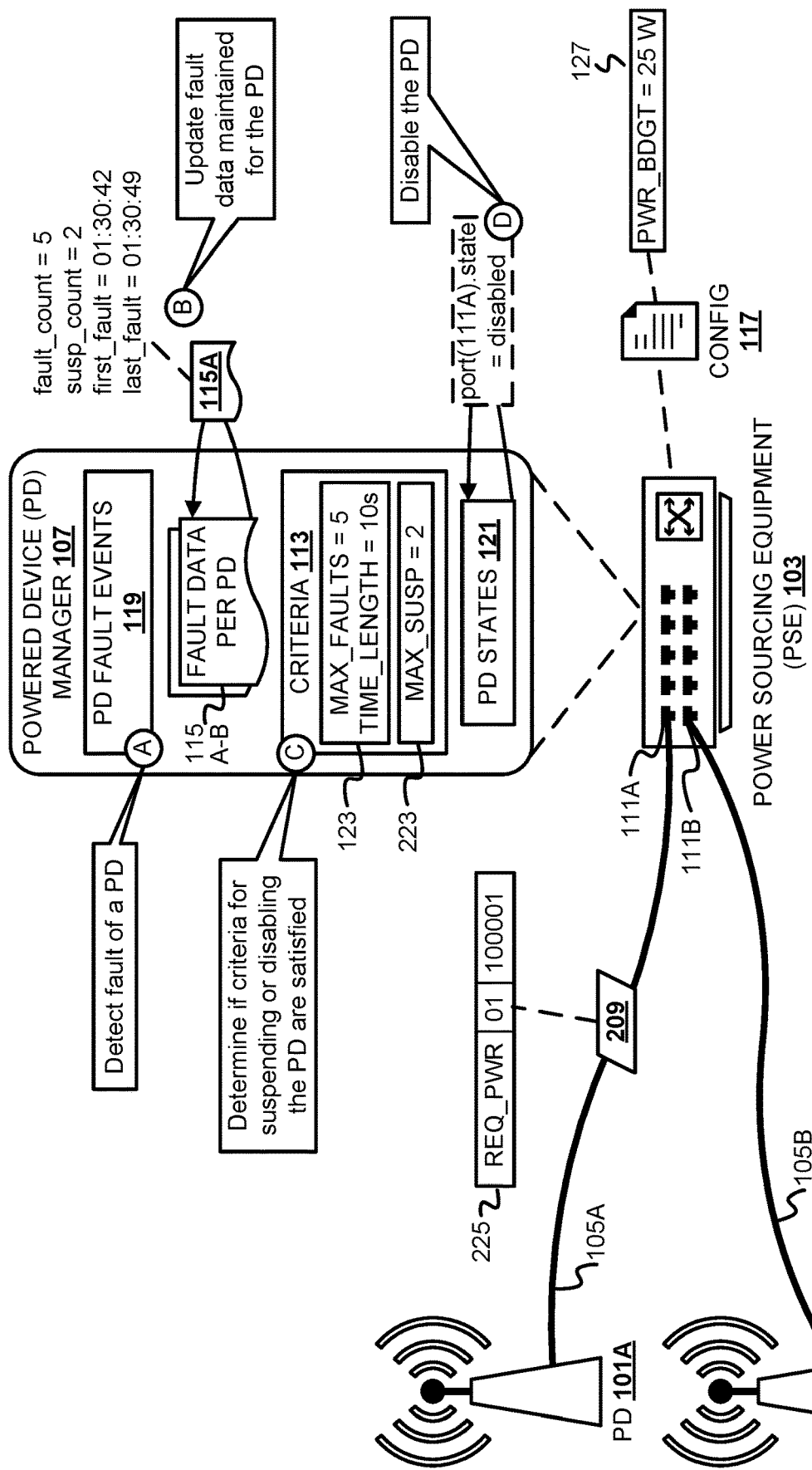
FIG. 2 is a conceptual diagram of disabling a powered device based on repeated detection of faults and suspensions of the powered device.

FIG. 2 is a conceptual diagram of disabling a powered device based on repeated detection of faults and suspensions of the powered device. FIG. 2 depicts the PDs 101A-B connected to the PSE 103 on respective ones of the ports 111A-B via respective ones of the Ethernet cables 105A-B. This example assumes that the PD 101A has previously been suspended twice as is indicated by the suspension count field of the fault data 115A that correspond to the PD 101A.

FIG. 2 is annotated with a series of letters A-D. These letters represent stages of one or more operations. Although these stages are ordered for this example, the stages illustrate one example to aid in understanding this disclosure and should not be used to limit the claims. Subject matter falling within the scope of the claims can vary from what is illustrated.

At stage A, the PD manager 107 detects a fault of the PD 101A. The PD manager 107 detects a PDU 209 transmitted by the PD 101A that is received on the port 111A. The PDU 209 is an LLDP data unit that comprises a TLV 225 that indicates a request for 33 W of power, represented with the binary number 100001 in FIG. 2, by the PD 101A. This wattage requested by the PD 101A exceeds the 25 W power budget 127 of the PSE 103. The PD manager 107 examines the TLVs of the PDU 209 and determines that the TLV 225 indicates a power request with a requested wattage that exceeds the power budget 127, which is recognized as one of the PD fault events 119 as similarly described in reference to FIG. 1. The PD manager 107 detects a fault for the PD 101A as a result.

At stage B, the PD manager 107 updates the fault data 115A maintained for the PD 101A. The PD manager 107 at least updates the fault data 115A to increment a fault count maintained for the PD 101A. As with the example given in FIG. 1, this example assumes that four faults were previously detected, so the incremented fault count has a value of five. This example also assumes that the fault count was reset after each suspension as described in in reference to FIG. 1 such that the incremented fault count is reflective of five detected faults since the last suspension of the PD 101A. However, in implementations, fault counts maintained for a powered device may not be reset following suspensions of the powered device, and fault count thresholds may instead be implemented per suspension (e.g., a threshold of five faults if the suspension count is zero, a threshold of ten faults if the suspension count is one, etc.). The PD manager 107 also records the timestamp of the fault associated with the PDU 209 in the field of the fault data 115A indicating the last fault, which is depicted as "01:30:49" in this example. This example also assumes that the first fault was detected previously with a timestamp of "01:30:42."

At stage C, the PD manager 107 determines if criteria for suspending or disabling the PD 101A are satisfied. In addition to the suspension criteria 123, the criteria 113 also comprise disabling criteria 223, which comprise a suspension count threshold having a value of two. The PD manager 107 may evaluate fault data against the disabling criteria 223 based on determining that the suspension criteria 113 are satisfied. In other words, if the PD manager 107 determines that the criteria for suspending a powered device are satisfied, the PD manager 107 can further determine whether to disable the powered device if the powered device has already been suspended greater than/equal to a maximum number of times based on one or more additional criteria. A powered device that is still faulting after repeated suspensions can potentially be removed from service due to being faulty.

Returning to FIG. 2, the PD manager 107 evaluates the fault data 115A based on the suspension criteria 123. The PD manager 107 determines that the suspension criteria 123 are satisfied because the fault data 115A indicate a fault count that satisfies the threshold of five and the difference between fault timestamps is less than the length of time given by the criteria 123. The PD manager 107 further evaluates the fault data 115A based on the disabling criteria 223 to determine if the count of previous suspensions of the PD 101A satisfies a threshold, with the disabling criteria 223 indicating an exemplary threshold of two suspensions. This example assumes that the PD 101A has previously been suspended twice as indicated by the suspension count field of the fault data 115A having a value of two. Since the count of suspensions of the PD 101A satisfies the threshold given by the disabling criteria 223, the PD manager 107 determines that the disabling criteria 223 are satisfied and the PD 101A should be disabled as a result.

At stage D, the PD manager 107 disables the PD 101A. The PD manager 107 disables the PD 101A so that subsequent communications received on the port 111A will not be processed or evaluated and that power should not be carried over the Ethernet cable 105A. Disabling the PD 101A can include updating the configuration 117 of the PSE 103 so that that communications received on the port 111A should not be processed or responded to (e.g., through disabling interrupts for the port 111A) and that power should not be supplied to the powered device connected to the port 111A. The PD manager 107 also updates the state maintained for the port 111A in the PD state data 121 to reflect that the PD 101A connected on the port 111A has been disabled. The port 111A will remain in the disabled state until the Ethernet cable 105A is physically disconnected from the port 111A, after which the state of the port 111A and fault data 115A can be reset to fault values (e.g., zero). The PD manager 107 can also redistribute/reallocate the power budget 127 as a result of disabling the PD 101A, such as to allot a greater amount of power to the PD 101B.

Figure 3:
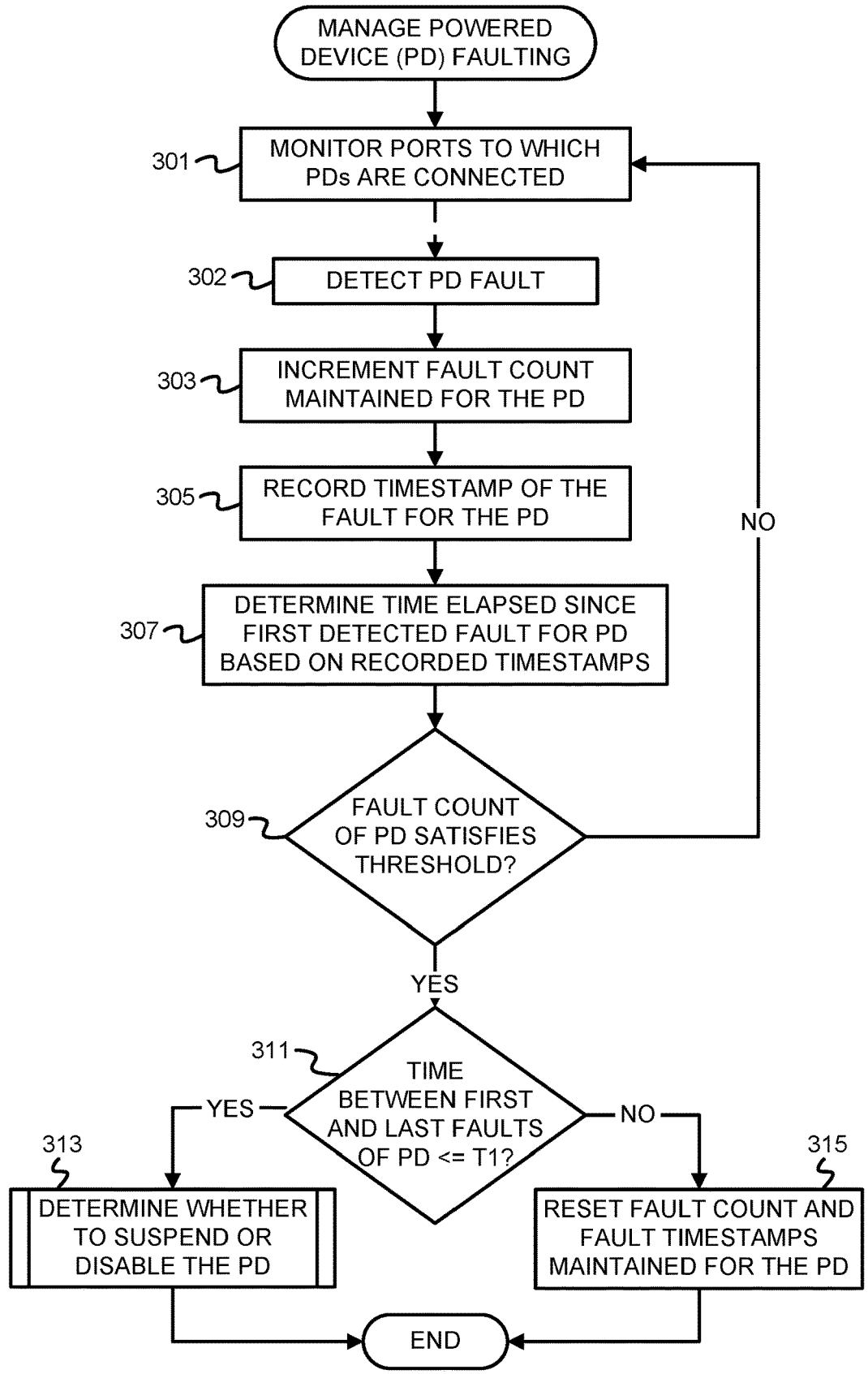
FIG. 3 is a flowchart of example operations for managing powered device faulting.
Figure 4:
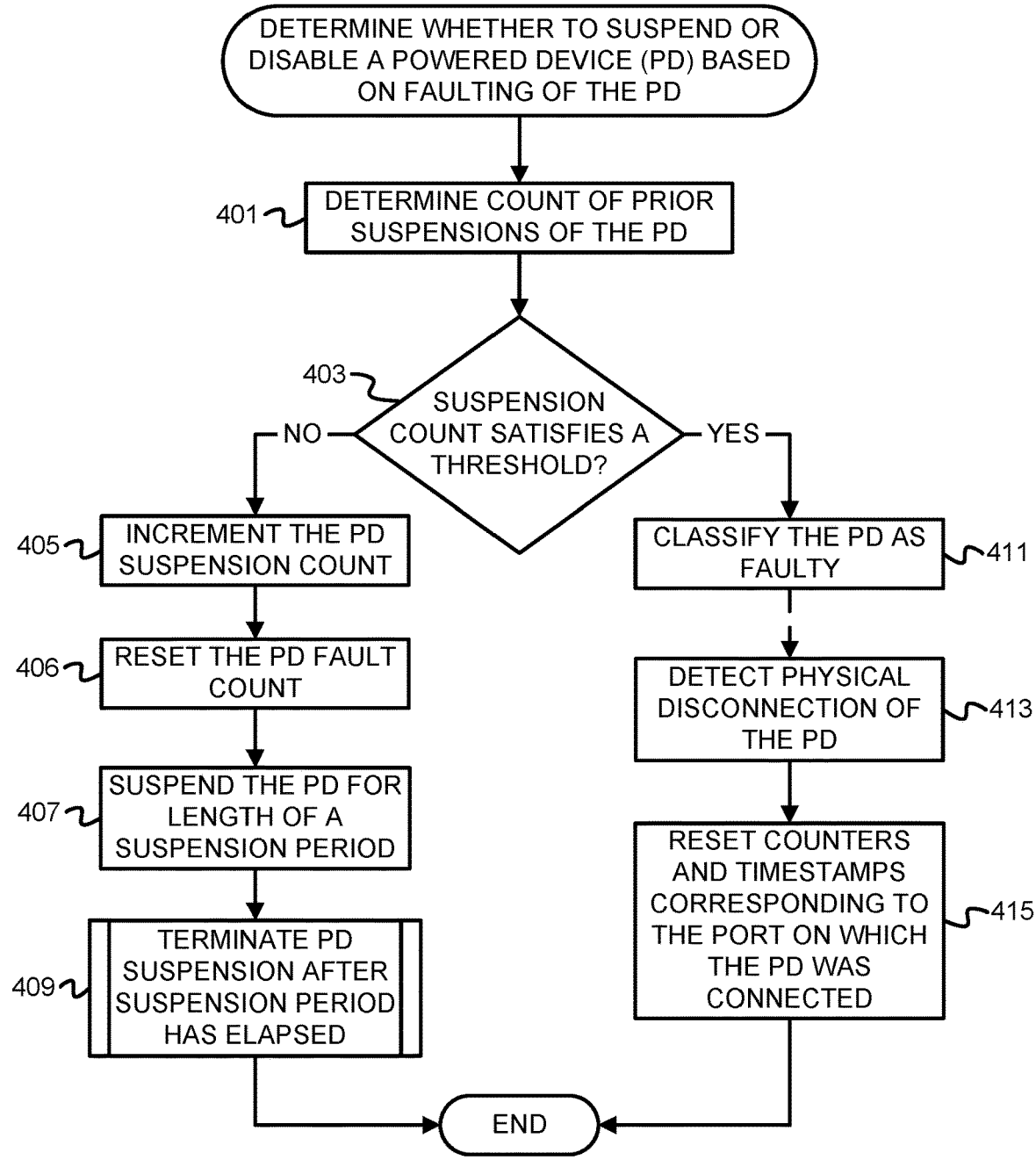
FIG. 4 is a flowchart of example operations for determining whether to suspend or disable a powered device based on faulting of the powered device.
Figure 5:
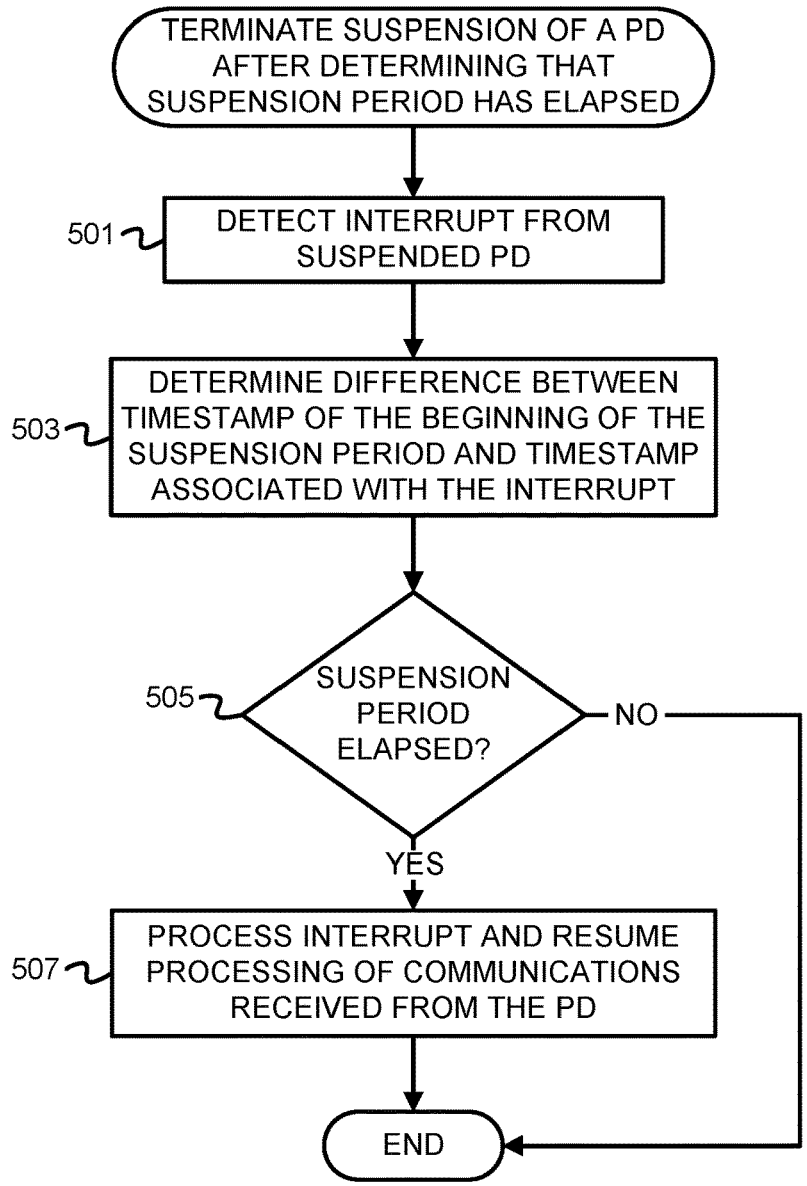
FIG. 5 is a flowchart of example operations for terminating suspension of a powered device after determining that a suspension period has elapsed.

FIGS. 3-5 are flowcharts of example operations associated with suspending and disabling faulting powered devices. The example operations are described with reference to a PD manager for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for managing powered device faulting. The example operations assume that at least one powered device is connected to PSE via an Ethernet cable in a PoE system (i.e., a system in which the PSE sources power to the powered device(s) according to PoE). The example operations also assume that the PD manager executes on the PSE.

At block 301, the PD manager monitors ports of the PSE to which powered devices are connected. The PD manager monitors the ports for events triggered from faulting of the powered devices and/or PDUs transmitted by the powered devices and received on the ports of the PSE. The powered devices may have been configured to generate events that are triggered from faulting and communicated to the PSE, where the generated events at least comprise an event identifier. The PD manager can monitor the ports of the PSE by polling the ports at fixed time increments (e.g., each second) or by awaiting receipt of notifications of incoming events and/or PDUs from another process executing on the PSE that detects incoming events and/or PDUs and communicates with the PD manager. A port can encompass multiple PoE channels. The example operations assume that the PD manager monitors a port across PoE channels, though in implementations, the PD manager can monitor each individual PoE channel corresponding to a port.

At block 302, the PD manager detects a fault for a powered device. Faults of powered devices can be of various types, such as overcurrent, short circuit, start faults (e.g., related to inrush current) ILIM/current limit faults, etc. If powered devices connected to the PSE have been configured to generate events that are triggered from faulting, the PD manager detects faults as fault events are generated by powered devices and received on a port of the PSE for handling by the PD manager. As another example, the PD manager can detect faults as PDUs are transmitted by powered devices, received on a port of the PSE, and determined to be indicative of a powered device fault based on examination of the data included therein by the PD manager. For instance, the PD manager may examine one or more TLVs of received LLDP data units to determine if a requested wattage of power exceeds a power budget of the PSE.

At block 303, the PD manager increments a fault count maintained for the powered device. The PD manager tracks fault data for each connected powered device. Fault data may be maintained in a database or other data store of the PSE that the PD manager can access as fault data are updated. As an example, the PD manager can create and maintain a data structure for each powered device connected to the PSE and update the data structure(s) as faults of the powered device(s) are detected. The data structure(s) may be created for each port of the PSE (e.g., for each port number/identifier) and updated as connections via Ethernet cable, faults, and disconnections are detected for the port. Fault data are said to correspond to a powered device based on the fault data being maintained for a port of the PSE on which the powered device is connected via Ethernet cabling and updated as events/PDUs corresponding to faults are received on that port. The fault data corresponding to a powered device comprise a first counter indicating a number of faults detected for the powered device. The PD manager accesses the fault data associated with the port on which the fault event or PDU that triggered the fault detection was received (e.g., based on a port number or identifier associated with the fault event or received PDU) and increments the first counter to reflect the detected fault. The PD manager can cache the fault data after updating the fault data for the powered device.

At block 305, the PD manager records a timestamp associated with the fault for the powered device. The fault data may also comprise fields for timestamps of a first fault reflected in the fault count and a last/most recent fault reflected in the fault count. The timestamp can be determined from the received data and/or metadata based on which the fault was detected (e.g., in a timestamp field) or can be recorded on receipt of the data and/or metadata. If the PD manager determines that the detected fault was the first fault (i.e., the incremented fault counter has a value of one), the PD manger can record the timestamp of the fault in both fields. Otherwise, the PD manager records the timestamp in the field indicating the time of the last fault.

At block 307, the PD manager determines the time elapsed since the first fault was detected for the powered device based on the recorded timestamps. The PD manager determines the time elapsed based on a difference between the timestamps recorded for the first and last faults detected for the powered device.

At block 309, the PD manager determines if the fault count of the powered device satisfies a threshold. The PD manager evaluates the value of the fault counter of the fault data maintained for the powered device against the threshold to determine if the value satisfies (i.e., exceeds or meets/exceeds) the threshold. If the fault count does not satisfy the threshold, operations continue at block 301. If the fault count satisfies the threshold, operations continue at block 311.

At block 311, the PD manager determines if the time between the first and last faults detected for the powered device is within (i.e., is less than or equal to) a length of time T1. The PD manager can determine a difference between the timestamps of the first fault and last fault recorded for the powered device in the fault data and determine whether the time difference is within the length given by T1 or exceeds this length of time. If the time between the first and last faults is within T1, operations continue at block 313. Otherwise, if the time between the first and last faults exceeds T1, operations continue at block 315.

At block 313, the PD manager determines whether to suspend or disable the powered device. Multiple faults of the powered device within a brief time period (e.g., the time period corresponding to T1) can be a result of temporary issues that can resolve without additional intervention and are not necessarily an indicator that the powered device is faulty. The powered device can be suspended for a temporary period to ideally allow these issues to resolve. If the powered device has already been suspended repeatedly, the PD manager can classify the powered device as faulty and disable the powered device to remove the faulty powered device from service. Example operations for determining whether the powered device should be suspended or disabled are given in further detail in reference to FIG. 4.

At block 315, the PD manager resets the fault count and fault timestamps maintained for the powered device. The PD manager can update the fault data maintained for the powered device (e.g., in the data structure corresponding to the port to which the powered device is connected) to reset the fault count to zero and the timestamps of the first and last faults to a default value, such as a null value. The PD manager can continue monitoring the ports of the PSE (i.e., as described at block 301) after the data maintained for the PD has been reset.

FIG. 4 is a flowchart of example operations for determining whether to suspend or disable a powered device based on faulting of the powered device. The example operations assume that a count of faults detected for a powered device within a given time period satisfies a threshold.

At block 401, the PD manager determines a count of prior suspensions of the powered device. As described above, the PD manager maintains fault data for each port of the PSE, such as in a data structure, and records counts of faults and suspensions therein. The PD manager determines the suspension count indicated in the fault data corresponding to the powered device.

At block 403, the PD manager determines if the suspension count satisfies a threshold. The PD manager maintains an additional threshold against which it evaluates suspension counts. This suspension count threshold may have a different value than the fault count threshold that was previously satisfied. As an example, the fault count threshold may have a value of five, and the suspension count threshold may have a value of two. If the suspension count does not satisfy the suspension count threshold, operations continue at block 405. Otherwise, operations continue at block 411.

At block 405, the PD manager increments the suspension count for the powered device. The PD manager can update the fault data corresponding to the powered device to increment the suspension count included therein. The PD manager can also update the fault data with a timestamp for the beginning of a suspension period. The timestamp that the PD manager records indicates the beginning of a time period during which the powered device will be suspended.

At block 406, the PD manager resets the fault count corresponding to the powered device. The PD manager updates the fault data corresponding to the powered device to reset a value of the fault count indicated therein to a default value (e.g., zero or a null value) such that counting of faults subsequently for the powered device will restart upon expiration of the suspension period. When resetting the fault count, the PD manager can also update the powered device's fault data to reset the timestamps corresponding to the first and last fault, such as to null value or a timestamp of the current Unix time.

At block 407, the PD manager suspends the powered device for a designated suspension period. Suspending the powered device is achieved through temporarily stopping processing of communications (i.e., events or PDUs) received on the port to which the powered device is connected. The PD manager can update a state of the port and/or powered device maintained by the PSE to designate that communications received on the port are not to be processed. The PD manager may begin a timer to be run for the length of the suspension period. The suspension period can be a variable length that depends on the suspension count. For instance, the length of the suspension period can scale up with increasing suspension counts. To illustrate, the length of the suspension period for a first suspension can be a first time period T2 (with T2 being the same or different length as the time period T1 during which the threshold-satisfying count of faults were detected). For subsequent suspensions when the suspension count is 2 or greater, the length of the suspension period can be greater than T2 (e.g., T2 doubled, tripled, quadrupled, etc.). As an example, the length of the suspension period when the suspension count is equal to one can be 30 seconds, the length of the second suspension period when the suspension count is equal to two can be 60 seconds, and so on.

At block 409, the PD manager terminates suspension of the powered device after determining that the suspension period has elapsed. When the suspension period has elapsed, the PD manager resumes processing of communications received from the suspended powered device. Identifying completion of the suspension period can be based on expiration of a timer if the PD manager started a timer for the suspension period or based on timestamps recorded in association with the powered device. Example operations for terminating the suspension period after determining that it has elapsed based on timestamps are given in further detail in FIG. 5.

At block 411, if the suspension count satisfied the suspension count threshold, the PD manager classifies the powered device as faulty. The PD manager classifies the powered device as faulty based on disabling processing of communications from the powered device and can disable sourcing of power to the powered device. The PD manager can update a state of the port of the PSE and/or the powered device that indicates that the powered device is disconnected, disabled, unavailable, etc. Alternatively, or in addition, the PD manager can disable interrupts for the PoE channel(s) that correspond to the port to which the powered device is connected. The PSE discontinues processing of communications received from the faulty powered device indefinitely as a result of the classification of the powered device as faulty. With the powered device classified as faulty, the PD manager can redistribute the power budget of the PSE across other devices connected to the PSE.

At block 413, the PD manager detects physical disconnection of the powered device. Physical disconnection of the powered device refers to disconnection of the Ethernet cable that connects the powered device to the PSE from the corresponding port of the PSE. The transition to block 413 from block 411 is depicted with dashed lines to reflect that physical disconnection of the powered device can occur later (or possibly not at all).

At block 415, the PD manager resets the counters and timestamps corresponding to the port of the PSE on which the powered device was connected. The PD manager can access the fault data that were maintained for the powered device (e.g., the data structure corresponding to the port on which the powered device was connected) and update the fault data to reset the fault and suspension counts to zero and the timestamps for faults and suspensions to a default value (e.g., a null value). Normal operations of updating the counters and timestamps corresponding to this port of the PSE as described above can resume subsequently if/when an Ethernet cable connected to a powered device is again connected to the PSE on the port.

FIG. 5 is a flowchart of example operations for terminating suspension of a powered device after determining that a suspension period has elapsed. The example operations assume that a powered device is suspended for a designated length of time (the "suspension period") and that a timestamp of the beginning of the suspension period is recorded for the powered device. As described above, the timestamp of the beginning of the suspension period can be recorded in fault data maintained for the port of the PSE corresponding to the powered device.

At block 501, the PD manager detects an interrupt from the suspended powered device. The interrupt may be a hardware interrupt or a software interrupt issued by the suspended powered device. The PD manager detects the interrupt on the port on which the powered device is connected to the PSE (i.e., via Ethernet cabling) and determines that the interrupt corresponds to a powered device that is suspended. Determining that the corresponding powered device is suspended can be based on a state maintained for the powered device and/or port number/identifier of the PSE on which the powered device is connected.

At block 503, the PD manager determines a difference between the timestamp of the beginning the suspension period and a timestamp associated with the interrupt. The timestamp associated with the interrupt may be determined from the received interrupt or may have been recorded by the PD manager after receipt of the interrupt. The difference between timestamps corresponds to the time elapsed since the powered device was suspended.

At block 505, the PD manager determines if the suspension period has elapsed. The PD manager determines if the difference between timestamps determined at block 503 exceeds the length of the suspension period that the PD manager is enforcing, where the length of the suspension period may be dependent on the count of suspensions of the powered device. If the suspension period has elapsed, operations continue at block 507. If the suspension period has not elapsed, operations are complete (i.e., the PSE does not process the interrupt).

At block 507, the PD manager processes the interrupt and resumes processing of communications received from the powered device. The PD manager can update a state of the port number/identifier and/or maintained for the powered device to indicate that the powered device is active/available rather than suspended.

Figure 6:
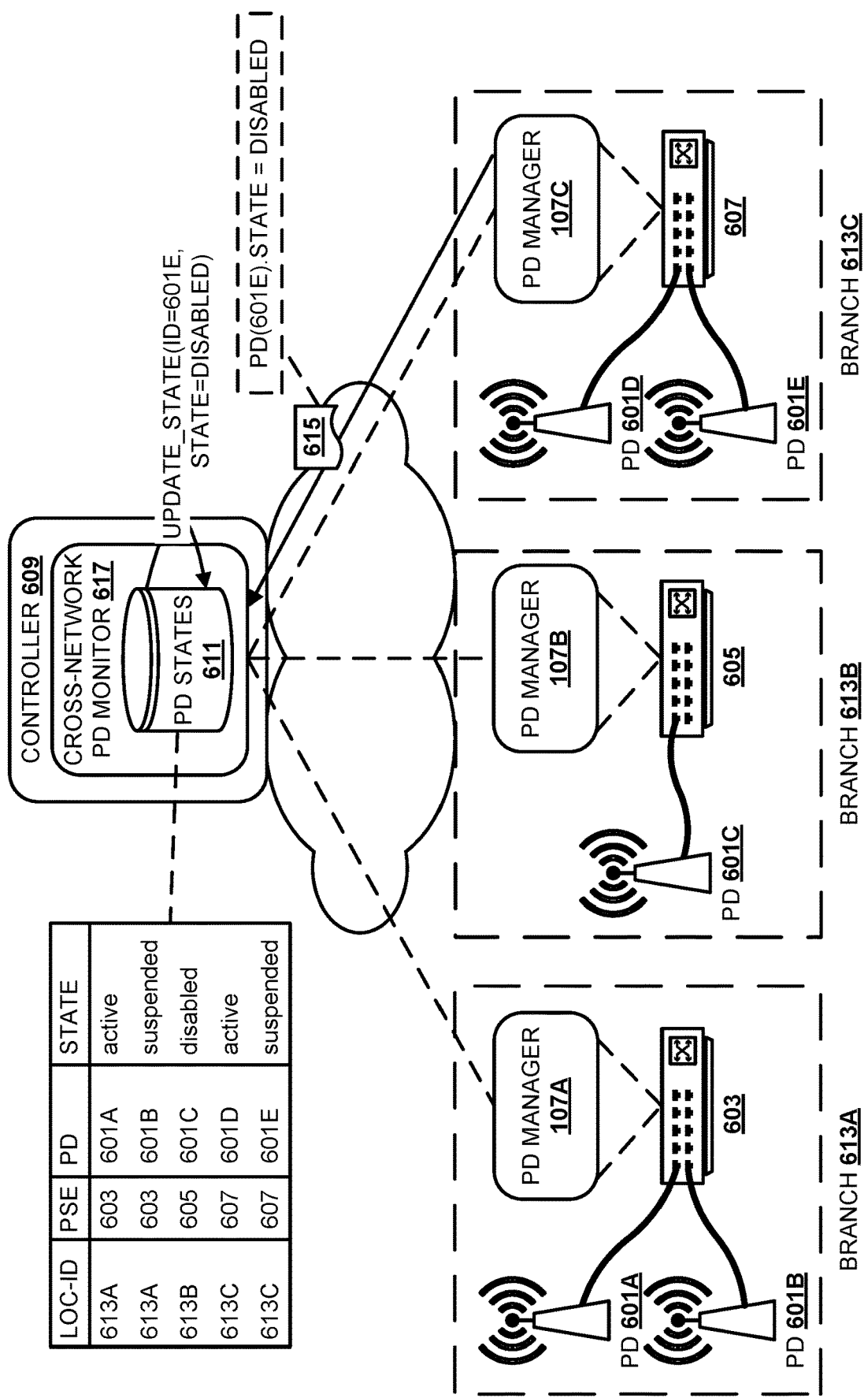
FIG. 6 is a conceptual diagram of managing suspension and disabling of powered devices distributed across branches of an SD-WAN.

FIG. 6 is a conceptual diagram of managing suspension and disabling of powered devices distributed across branches of an SD-WAN. Suspension of powered devices and disabling of powered devices classified as faulty can be implemented in an SD-WAN architecture. In such implementations, the SD-WAN controller tracks states of powered devices having an instance of the PD manager installed thereon across the SD-WAN. This allows for centralized management of powered devices and facilitates identification of those that are faulty in SD-WANs that may have a plurality of powered devices deployed.

A controller 609 is an SD-WAN controller that oversees PSE 603, PSE 605, and PSE 607 that are deployed to a branch 613A, a branch 613B, and a branch 613C, respectively. The PSE 603 sources power to a PD 601A and a PD 601B located at the branch 613A according to PoE. The PSE 605 sources power to a PD 601C located at the branch 613B according to PoE. The PSE 607 sources power to a PD 601D and a PD 601E located at the branch 613C according to PoE. The PSE 603, PSE 605, and PSE 607 each have an instance of the PD manager 107 installed thereon, and these instances are depicted as PD manager 107A, PD manager 107B, and PD manager 107C. A cross-network PD monitor ("PD monitor") 617 executes on the controller 609 and can communicate with each of the PD managers 107A-C over secure connections established therebetween.

The PD monitor 617 maintains or has access to a database 611 that stores states of powered devices deployed across the SD-WAN. The PD monitor 617 can update the database 611 with identifiers and/or names of powered devices as powered devices are onboarded to the SD-WAN. Each entry of the database 611 indicates a name or identifier of the powered device (e.g., a network address(es)) and a state of the powered device. FIG. 6 also depicts entries of the database 611 as indicating identifiers of the location (e.g., branch office identifier/name) and PSE of the corresponding powered device. As described above, powered devices can be suspended, disabled, or active/available (i.e., not suspended or disabled), which is represented in the state field of each database 611 entry. To illustrate, an entry of the database 611 corresponding to the PD 601A indicates that the PD 601A is in an active state, while an entry corresponding to the PD 601B indicates that the PD 601B is in a suspended state.

The PD managers 107A-C detect faults and manage suspension or disabling of powered devices as described above. The PD managers 107A-C also alert/notify the PD monitor 617 when the state of a powered device that is powered by a corresponding one of the PSEs 603, 605, 607 changes. When one of the PD managers 107A-C changes the state of a powered device (i.e., by suspending a powered device, terminating suspension of a powered device, or disabling a powered device), the one of the PD managers 107A-C generates an alert, notification, request, etc. that it communicates to the PD monitor 617 over the secure connection established between the respective one of the PD managers 107A-C and the controller 609. This communication identifies the powered device for which the state was changed and the updated state. In this example, the PD 601E is assumed to have been suspended repeatedly and is being disabled as a result.

As part of disabling the PD 601E, the PD manager 107C generates an alert 615 indicating the change in state of the PD 601E and transmits the alert 615 to the PD monitor 617. The alert 615 comprises an identifier of the PD 601E and the updated state of the PD 601E. In implementations, the alert 615 may comprise invocation of an API of the database 611 that is exposed to instances of the PD manager 107 executing on PSE deployed to the SD-WAN. The PD monitor 617 receives the alert 615 and updates the entry in the database 611 corresponding to the PD 601E to indicate the updated state of the PD 601E. As a result, the state of the PD 601E maintained in the database 611 is indicated as "disabled." Entities accessing information about states of powered devices deployed across the SD-WAN will thus have visibility into states of powered devices as the states change. For instance, an entity can monitor the database 611 to identify which powered devices are disabled and dispatch technical support to the corresponding branch office as a result.

Variations

The example operations refer to the use of timestamps for determining whether the fault count exceeds a fault count threshold within a first time period after each fault detection. In implementations, the PD manager may instead utilize a timer that runs for the duration of the first time period. While the timer runs, the PD manger can process faults and increment fault counts detected for powered devices. Upon expiration of the timer, the PD manager can evaluate fault counts corresponding to powered devices based on the fault count threshold to determine whether the fault counts detected for any of the powered devices during the first time period (i.e., while the timer ran) satisfy the fault count threshold. The powered devices for which the corresponding fault counts satisfied the threshold can then be suspended.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in FIG. 3 can be performed in parallel or concurrently across powered devices. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
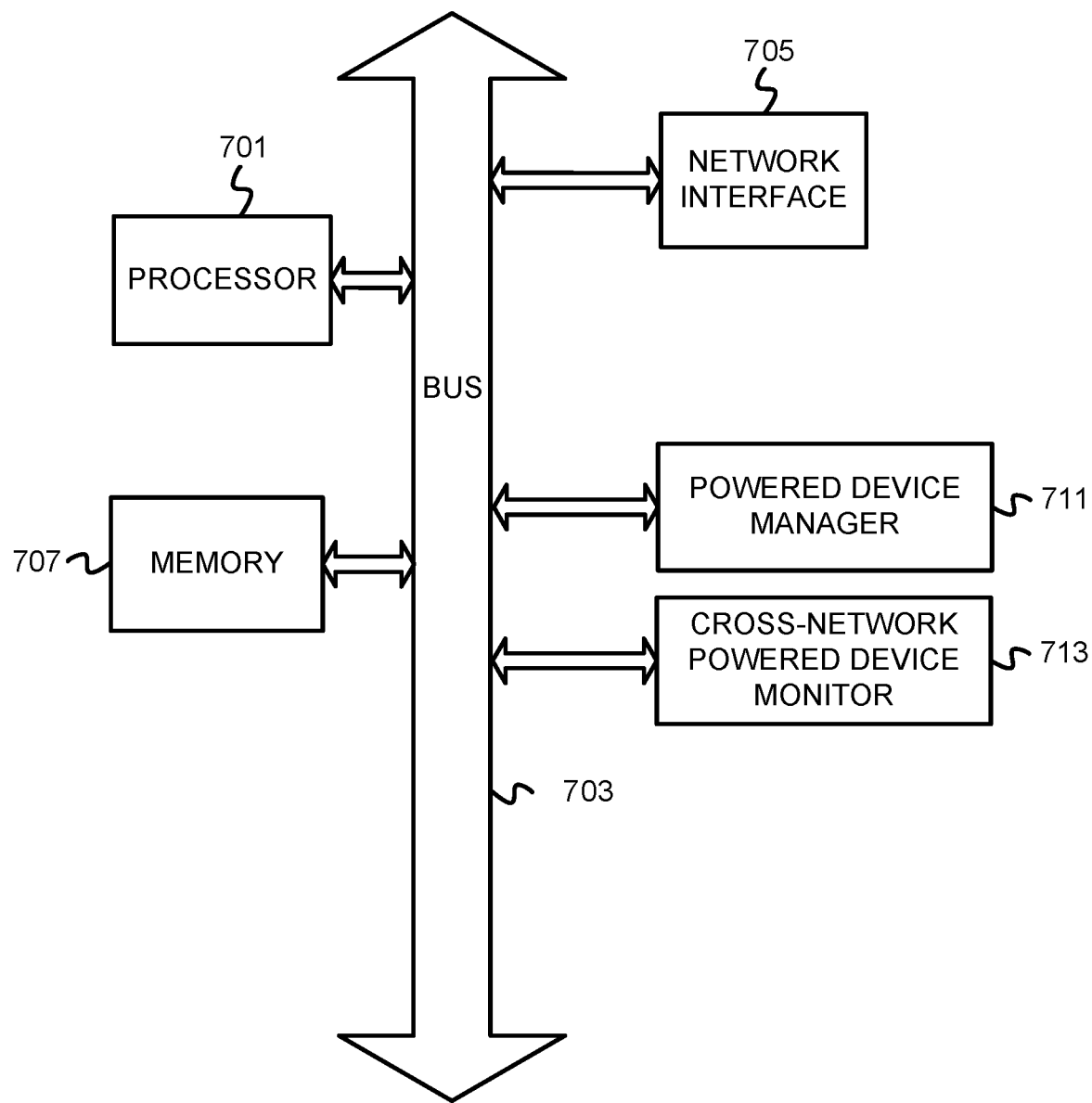
FIG. 7 depicts an example computer system with a PD manager and a cross-network PD monitor.

FIG. 7 depicts an example computer system with a PD manager and a cross-network PD monitor. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes PD manager 711 and cross-network PD monitor 713. The PD manager 711 manages suspension of powered devices based on detecting a count of faults that satisfies criteria for powered device suspension. The PD manager 711 also manages disabling of powered devices based on determining that a count of suspensions of a powered device that is faulting satisfies criteria for disabling faulty powered devices. The cross-network PD monitor 713 tracks and records states of powered devices deployed across networks (e.g., across branches) in an SD-WAN. While depicted as part of the same system in FIG. 7, the PD manager 711 and the cross-network PD monitor 713 do not necessarily execute as part of the same system. For instance, the PD manager 711 can execute on a first system (e.g., PSE) and the cross-network PD monitor 713 can execute as part of an SD-WAN controller. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

The invention claimed is:

1. A method comprising:
   detecting a first fault for a device powered via an Ethernet cable;
   determining that a count of faults detected for the device within a first length of time exceeds a first threshold;
   determining if the device should be suspended or classified as faulty based on determining if a count of suspensions of the device exceeds a second threshold; and
   based on determining that the count of suspensions of the device exceeds the second threshold, classifying the device as faulty; and
   based on determining that the count of suspensions of the device does not exceed the second threshold, suspending the device for a second length of time.

2. The method of claim 1, wherein classifying the device as faulty comprises at least one of terminating processing of communications received from the device and discontinuing sourcing of power to the device via the Ethernet cable.

3. The method of claim 1, wherein suspending the device for the second length of time comprises suspending processing of communications received from the device during the second length of time, and wherein the second length of time is based on the count of suspensions of the device.

4. The method of claim 1 further comprising terminating suspension of the device upon completion of the second length of time, wherein terminating suspension of the device comprises resuming processing of communications received from the device.

5. The method of claim 1 further comprising, based on expiration of the second length of time,
   detecting a second fault for the device and determining that the count of faults detected within the first length of time satisfies the first threshold; and
   based on determining that the count of suspensions of the device does not exceed the second threshold, suspending the device for a third length of time, wherein the third length of time is greater than the second length of time.

6. The method of claim 1 further comprising:
   sourcing power to one or more other devices powered according to PoE, wherein a power budget is distributed across the device and the one or more other devices; and
   redistributing the power budget across the one or more other devices based on classifying the device as faulty.

7. The method of claim 1, wherein detecting the first fault comprises detecting a Link Layer Discovery Protocol (LLDP) data unit from the device that comprises a type-length-value (TLV) indicating a request for a wattage of power and determining that the wattage of power requested by the device exceeds a power budget allotted to powered devices.

8. The method of claim 1 further comprising:
   maintaining a first counter indicating the count of faults detected for the device and incrementing the first counter based on detecting the first fault for the device; and
   maintaining a second counter indicating the count of suspensions of the device and incrementing the second counter based on suspending the device.

9. The method of claim 8 further comprising, based on determining that the count of faults detected for the device within the first length of time does not exceed the first threshold, resetting the first counter and the second counter.

10. One or more non-transitory machine-readable media having program code stored thereon, the program code comprising instructions to:
    detect a first fault for a powered device, wherein the powered device is powered via Ethernet cabling;
    determine whether faults that have been detected for the powered device satisfy a first criterion for suspending powered devices based on a count of the faults, wherein the count of the faults accounts for at least the first fault;
    based on a determination that the faults detected for the powered device satisfy the first criterion, suspend processing of communications received from the powered device;
    based on detection of subsequent faults for the powered device, determine whether a count of suspensions of the powered device satisfies a second criterion; and
    based on a determination that the count of suspensions of the powered device satisfies the second criterion, terminate processing of communications received from the powered device.

11. The non-transitory machine-readable media of claim 10,
    wherein the first criterion comprises a first threshold, and
    wherein the instructions to determine whether the faults satisfy the first criterion comprise instructions to determine whether the count of the faults exceeds the first threshold and whether the faults were detected within a designated length of time.

12. The non-transitory machine-readable media of claim 11, wherein the instructions to determine whether the faults were detected within the designated length of time comprise instructions to determine whether the faults were detected within the designated length of time based on timestamps associated with the faults.

13. The non-transitory machine-readable media of claim 10, wherein the program code further comprises instructions to:
    maintain a counter indicating the count of suspensions of the powered device; and
    increment the counter based on suspension of processing of communications received from the powered device,
    wherein the instructions to determine whether the count of suspensions of the powered device satisfies the second criterion comprise instructions to determine whether the count of suspensions indicated by the counter satisfies a second threshold.

14. Power sourcing equipment (PSE) comprising:
    a plurality of ports, wherein the PSE sources power to a plurality of powered devices connected to the PSE on corresponding ones of the plurality of ports;
    a processor; and
    a machine-readable medium having instructions stored thereon that are executable by the processor to cause the PSE to:

detect a first fault for a first powered device of the plurality of powered devices that is connected to a first port of the plurality of ports;

determine if a count of faults detected for the first powered device within a length of time satisfies a first threshold;

based on a determination that the count of faults detected for the first powered device within the length of time satisfies the first threshold, suspend the first powered device for a suspension period;

after the suspension period, based on detection of subsequent faults for the first powered device and satisfaction of the first threshold, determine whether a count of suspensions of the first powered device satisfies a second threshold; and based on a determination that the count of suspensions of the first powered device satisfies the second threshold, classify the first powered device as faulty.

15. The PSE of claim 14, wherein the instructions executable by the processor to cause the PSE to determine if the count of faults detected for the first powered device within the length of time satisfies the first threshold comprise instructions executable by the processor to cause the PSE to:

based on detection of the first fault, increment a counter indicating the count of faults detected for the first powered device; and determine if the count of faults satisfies the first threshold and if the faults represented by the count of faults have been detected within the length of time based on timestamps associated with the faults.

16. The PSE of claim 14, wherein the instructions executable by the processor to cause the PSE to suspend the first powered device for the suspension period comprise instructions executable by the processor to cause the PSE to suspend processing of communications received on the first port during the suspension period.

17. The PSE of claim 16 further comprising instructions executable by the processor to cause the PSE to, based on expiration of the suspension period, resume processing of communications received on the first port.

18. The PSE of claim 14, wherein the instructions executable by the processor to cause the PSE to classify the first powered device as faulty comprise at least one of instructions executable by the processor to cause the PSE to terminate processing of communications received from the first powered device on the first port and instructions executable by the processor to cause the PSE to discontinue sourcing of power to the first powered device via an Ethernet cable.

19. The PSE of claim 14 further comprising instructions executable by the processor to cause the PSE to redistribute power sourced among the plurality of powered devices based on classification of the first powered device as faulty.

20. The PSE of claim 14, wherein the instructions executable by the processor to cause the PSE to detect the first fault comprise instructions executable by the processor to cause the PSE to detect a Link Layer Discovery Protocol (LLDP) data unit from the first powered device that comprises a type-length-value (TLV) indicating a request for a wattage of power and determine that the wattage of power requested by the first powered device exceeds a power budget allotted to powered devices.

* * * * *